(No Model.)
G. B. WEBB.
CHECK PERFORATING MACHINE.
No. 473,647. Patented Apr. 26, 1892.
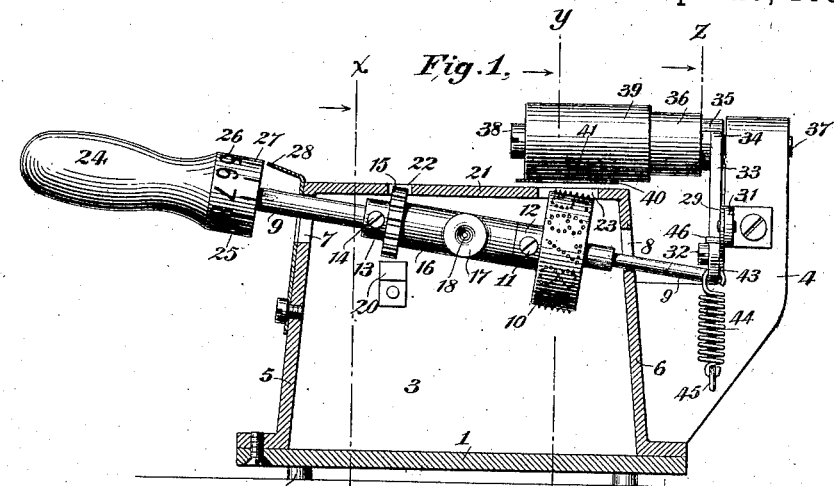
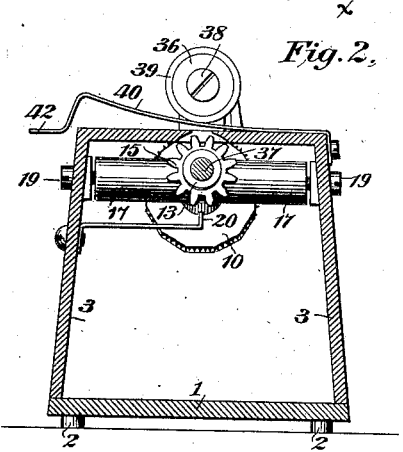
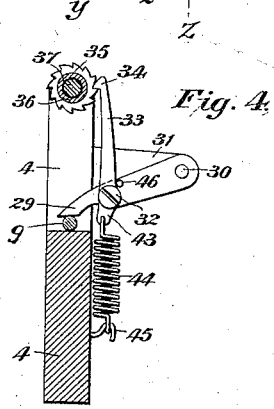
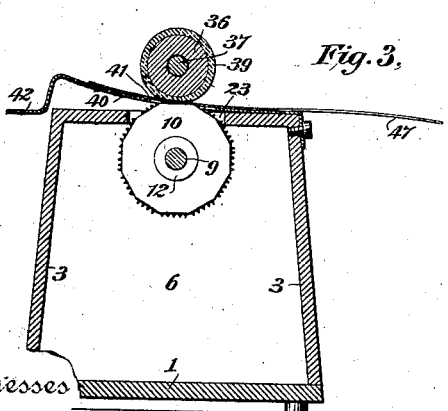
Witnesses
Geo. W. Breck
Edward Thorpe
Inventor
George B. Webb
By his Attorney
Jacob Felbel

UNITED STATES PATENT OFFICE.

GEORGE B. WEBB, OF NEW YORK, N. Y.

CHECK-PERFORATING MACHINE.

SPECIFICATION forming part of Letters Patent No. 473,647, dated April 26, 1892.

Application filed May 6, 1891. Serial No. 391,714. (No model.)

*To all whom it may concern:*

Be it known that I, GEORGE B. WEBB, a citizen of the United States, and a resident of New York city, in the county of New York and State of New York, have invented certain new and useful Improvements in Check-Perforating Machines, of which the following is a specification.

My invention relates to contrivances for marking amounts by pins or perforators or equivalent devices in or upon checks, drafts, notes, or other commercial paper, and has for its main objects to provide a simple, cheap, and effective apparatus for this purpose.

To these ends my invention consists in the various features of construction and combinations of devices hereinafter more fully described, and particularly pointed out in the appended claims.

In the accompanying drawings, Figure 1 is a vertical longitudinal section of a machine embodying my improvements. Fig. 2 is a vertical cross-section thereof, taken at the line $x$ $x$ of Fig. 1. Fig. 3 is a similar section taken at the line $y$ $y$ of Fig. 1, and Fig. 4 is a like section taken at the line $z$ $z$ of Fig. 1.

In the several views the same part will be found designated by the same numeral of reference.

1 designates a base-plate which may be fitted with rubber feet 2. Upon said plate is fixed a casing or support 3, provided with an arm or bracket 4, which may be cast integral therewith. The end walls or plates 5 and 6 of the casing are formed, respectively, with openings 7 and 8, through which extends a shaft or spindle 9, arranged to stand normally in an inclined position. Upon said shaft and within the casing is a wheel, disk, or barrel 10, secured in place, preferably, by a set-screw 11, passing through a hub 12, extending forward from the wheel. The periphery of the wheel is formed with a series of flat or plane faces, (twelve, more or less,) and each face is provided with a series of points, teeth, or pins disposed to form a numeral or other character. In practice I prefer to form of said pins the following numerals and characters and arrange them in the order enumerated—viz., "$, X, 0, 1, 2, 3, 4, 5, 6, 7, 8, 9." Upon said shaft and within the casing is also mounted, by means of a hub 13 and set-screw 14, a toothed or ratchet wheel 15, which, like the wheel 10, is set at right angles to the axis of the shaft. The said shaft has a bearing in a sleeve or tube 16, which, about midway of its length, is formed or provided on each side with an arm 17, extending over to near each side plate of the casing, and formed in its end with a depression 18 to receive a conical-pointed screw or center 19, extending laterally inward from each side plate. The perforating-wheel 10 is preferably arranged on one side of the centers 19 and the ratchet-wheel 15 on the other. Beneath the ratchet-wheel is a fixed tooth or dog 20, adapted to enter between any two of the teeth of the ratchet-wheel when the latter is depressed, and thus prevent any rotation of the shaft and the perforating-wheel thereon.

The top plate 21 of the casing is provided with an opening 22 to accommodate the upper side of the ratchet-wheel and with a larger opening 23 for the perforating-wheel to work through and enable the character thereon which may be uppermost to be impressed in or upon the paper desired to be marked.

The outer forward end of the shaft is provided with a handle 24, which has a cylindrical portion 25, provided at 26 with a series of numerals and other characters corresponding to those on the perforating-wheel and arranged to register or align therewith, and which is also provided at 27 with a series of short lines or indices—one for each numeral or other character—to co-operate with an index or pointer 28, affixed to the casing for the purpose of assisting the user in bringing the desired perforating character to the marking position. The rearmost end of the shaft 9 rests upon the horizontal portion of the bracket 4 and beneath an arm 29, pivoted at 30 in an extension 31 of the bracket. To said arm is pivoted at 32 a vertically-arranged lever 33, formed at its upper end with a hook or driving-pawl 34, which engages with and is also adapted to intermittently turn a ratchet-wheel 35, fast on a sleeve 36, that is mounted on a fixed pin or round rod 37, secured to the bracket 4 and projecting forward over the opening through which the perforating devices work. The said sleeve 36 is held in place longitudinally by a screw 38, entering the end of the rod 37, and upon said sleeve or core is placed a soft-rubber or other tube 39, which works in conjunction with a spring-pressure plate 40, attached to the casing. The said plate is cut away or slotted at 41 for the passage therethrough of the perforating devices and is provided at its free end with a finger-piece 42, by which the plate may be pressed down parallel with the top of the casing for the convenient introduction of the paper to be impressed between said plate and the feed roller or tube 39. The driving-lever 33 extends below its pivot and at 43 is connected one end of a spiral spring 44, whose opposite end is attached to a hook 45, projecting from the bracket. The upper end of said spring is connected to the lever 33 at a point between the fulcrum and the bracket, and hence has a tendency to always keep the pawl end of the lever in engagement with the ratchet-wheel, besides performing the function of turning the feed-roll through the ratchet-wheel and of returning the operating-shaft and its appendages to their normal positions after actuation.

In order to prevent the ratchet-wheel and roll from being shifted from correct position relatively to the driving-pawl, a pin or stop 46 on the arm 29 bears against the lever 33 when at rest, and prevents any disengagement of the pawl and ratchet-wheel.

In the operation of the contrivance the user, by means of the finger-piece 42, may press down the plate 40, and insert the check or other paper 47 to be marked between said plate and the rubber tube 39, which, with its support, forms a feed-roller and abutment. The plate may then be released and allowed to spring up to the position shown to press the paper against the feed-roller. If it be desired to perforate the paper with the amount "$24," the user may then, by means of the handle, rotate the index and hence the shaft, perforating-wheel, and locking-ratchet, until the dollar-sign ("$") registers with the pointer. When this has been accomplished the dollar-sign ("$") on the perforating-wheel by the same movement will have been brought uppermost and in line with the opening in the cover or top plate and in marking position. The user may then force down the handle end of the shaft, and thus throw up the marking-wheel and cause the dollar-sign to pass through the openings 23 and 41 and perforate the paper held between the pressure-plate and the feed-roll, the latter serving as an abutment. As soon as the perforating-wheel starts to move toward the paper the toothed wheel 15 moves toward the dog 20 and engages therewith to prevent any further rotation of the shaft and marking-wheel during the perforating operation. During the ascent of the marking-wheel the rear end of the shaft lifts the free end of the pivoted arm 29 and through it, against the tension of the spring 44, the lever 33, so as to cause its pawl end to engage a fresh tooth of the driving ratchet-wheel. Upon releasement of the handle, the said spring acts to turn the ratchet-wheel one tooth and return to normal position the arm 29 and the shaft and its attachments. The turning of the ratchet-wheel one tooth operates to partially rotate the feed-roll and cause it in connection with the pressure-plate to feed the paper the distance of one character on the marking-wheel, so as to automatically present a new portion of the paper for the impression of the next character. Having thus printed the dollar-sign and fed the paper forward the user may then turn the handle until the numeral "2" on the index is brought to register with the pointer and the perforating character "2" is brought to the marking position. The handle may then be depressed as before, and the actions of the various moving parts will be repeated and the numeral "2" will be marked upon the paper immediately following the dollar-sign. Then the handle may be released to permit the parts to all return to their first positions and the paper to be again fed a character distance. The marking of the numeral "4" may then be proceeded with in like manner, and when performed the paper may be readily pulled out or removed from the machine by again depressing the finger-piece of the pressure-plate. By inclining the shaft the plane faces of the perforating-wheel may be brought parallel with the horizontal axis of the feed-roller, and the perforating-pins of each character may thus mark the paper uniformly as to depth of perforation. By reason of the tubular bearing 16 and the lateral pivot-arms 17 the shaft 9 may be rotated as well as vibrated.

As far as one feature of my invention is concerned, the automatic paper-feed may be dispensed with and the user compelled to feed the paper by hand after each impression, in which event a mere abutment would be used in lieu of a step-by-step feed-roller.

Instead of placing the means for locking the shaft against rotation at the locality shown, the same may be placed elsewhere—for instance, adjacent to the perforating-wheel, in which case the dog would be fixed to overlie the toothed wheel—and it will be readily understood that numerous other changes in location and detail construction may be made without departing from the main features of my invention.

I am aware that heretofore machines have been patented comprising a rotating and vibrating wheel having cutting-punches adapted to co-operate with fixed die-plates or female dies, whereby portions of the paper-stock may be cut or punched out to leave clean stenciled holes, and I disclaim such construction. My machine involves the idea of puncturing or tearing or disrupting the fibers, in contradistinction to cutting or shearing out portions of the paper, and my claims are all restricted to means which will accomplish this purpose and which will not perform the functions of punches and dies.

What I claim as new, and desire to secure by Letters Patent, is—

1. In a check-marking machine, the combination of a shaft having a rotatory and a vibratory motion, a marking-wheel on said shaft, having puncturing devices constructed to tear or disrupt the fibers of the paper, a combined feed-roller and abutment having a yielding surface, and a step-by-step feed mechanism for turning the same, actuated by the vibratory movement of said shaft, substantially as set forth.

2. In a check-marking machine, the combination of a shaft having a rotatory and a vibratory motion, a marking-wheel on said shaft, having puncturing devices constructed to tear or disrupt the fibers of the paper, a combined feed-roller and abutment having a yielding surface, a step-by-step feeding mechanism, and a spring, as 44, substantially as set forth.

3. In a check-marking machine, the combination of a shaft having a rotatory and a vibratory motion, a marking-wheel thereon having puncturing devices constructed to tear or disrupt the fibers of the paper, a combined feed-roller and abutment having a yielding surface, a ratchet-wheel, a driving-lever, a pivoted arm, and a spring, substantially as set forth.

4. In a check-marking machine, the combination of a shaft having a rotatory and a vibratory motion, a marking-wheel thereon having puncturing devices constructed to tear or disrupt the fibers of the paper, a combined feed-roller and abutment having a yielding surface, a ratchet-wheel, a driving-lever, a pivoted arm, a stop or pin for said lever, and a spring, substantially as set forth.

5. In a check-marking machine, the combination of a shaft having a rotatory and a vibratory motion, a marking-wheel thereon having puncturing devices constructed to tear or disrupt the fibers of the paper, a combined feed-roller and abutment having a yielding surface, a step-by-step feeding mechanism, and a spring-pressure plate, substantially as set forth.

6. In a check-marking machine, the combination of a casing, a shaft, a tubular bearing in which to rotate said shaft, lateral pivots for said bearing, a handle and an index on one end of the said shaft, a marking-wheel on said shaft having puncturing devices constructed to tear or disrupt the fibers of the paper, a cover or top on said casing, an opening in said cover, a slotted pressure-plate, a combined feed-roller and abutment having a yielding surface, a feeding mechanism, and a locking contrivance for said shaft, substantially as set forth.

7. In a check-marking machine, the combination, with a casing or support and an abutment, of a shaft having a marking-wheel rigidly secured thereto and a tubular bearing extending longitudinally of said shaft to support the same and arranged between said marking-wheel and the handle of said shaft and pivoted laterally on both sides to the casing or support to have an up-and-down vibratory movement only and to guide said shaft and marking-wheel when the handle is depressed and the wheel raised to puncture the paper.

Signed at New York city, in the county of New York and State of New York, this 2d day of May, A. D. 1891.

GEORGE B. WEBB.

Witnesses:
JACOB FELBEL,
MARTIN COHEN.